RING OSCILLATOR PULSE PRODUCING CIRCUIT

Filed Dec. 19, 1949 2 Sheets-Sheet 1

INVENTOR
HARRIS GALLAY
BY R.P. Morris
ATTORNEY

June 16, 1953 H. GALLAY 2,642,526

RING OSCILLATOR PULSE PRODUCING CIRCUIT

Filed Dec. 19, 1949 2 Sheets-Sheet 2

INVENTOR
HARRIS GALLAY
BY R P Morris
ATTORNEY

Patented June 16, 1953

2,642,526

UNITED STATES PATENT OFFICE 2,642,526

RING OSCILLATOR PULSE PRODUCING CIRCUIT

Harris Gallay, Belleville, N. J., assignor to Federal Telecommunication Laboratories, Inc., New York, N. Y., a corporation of Delaware Application December 19, 1949, Serial No. 133,853

7 Claims. (Cl. 250—27)

This invention relates to ring oscillator pulse producing circuits and more particularly to oscillators in which a series of electron discharge devices are caused sequentially to operate, either as a free running oscillator or as a synchronized oscillator.

Various types of ring oscillators in which a series of tubes are so connected that they are operated in sequence have heretofore been proposed. In general such circuits are usually made of electron discharge devices so connected that upon cessation of operation of one device a voltage is applied to the next succeeding device to render it operative. In such systems as devised in the past considerable complications have been introduced in the circuits to assure that only one discharge device will be triggered into operation at a time. Moreover, when synchronisation is required, considerable care must be exercised to assure that this is properly accomplished.

Furthermore, in systems of this nature it is generally quite difficult to assure that the discharge devices operate for a given fixed period of time. Usually if pulse outputs are desired it is necessary to shape the output energy to secure pulses of constant duration and repetition frequency.

It is an object of this invention to provide a simple circuit of the ring oscillator type in which only one of the discharge devices may operate at a time.

It is a further object of this invention to provide a ring oscillator in which the separate output pulses of the several electron discharge devices are each of precise time duration and repetition rates.

According to a feature of this invention the operation of only a single electron discharge device or tube of the ring oscillator is assured by providing a current limiter device in series with a common anode and cathode circuit of the system, adjusted so that the current is sufficient to maintain only one of the tubes conductive.

According to another feature of the device capacitive and resistive coupling is used between successive tubes, with the values of the resistors and capacitors so chosen that a fixed time constant in excess of the duration of operation is maintained. Such an oscillator may be brought into synchronism by periodic pulses applied to the common cathode circuit, for example, once for each pulse. Alternatively, synchronizing pulses derived from an oscillator having a period less than the normal timing of the time constant circuit may be used to generate positive synchronizing pulses to apply to the common cathode circuit to assure generation of pulses having a precise time duration corresponding with the spacing of the synchronizing pulses.

The above-mentioned and other features and objects of this invention and the manner of attaining them will become more apparent and the invention itself will be best understood by reference to the following description of an embodiment of the invention taken in conjunction with the accompanying drawings, wherein.

Figure 1:
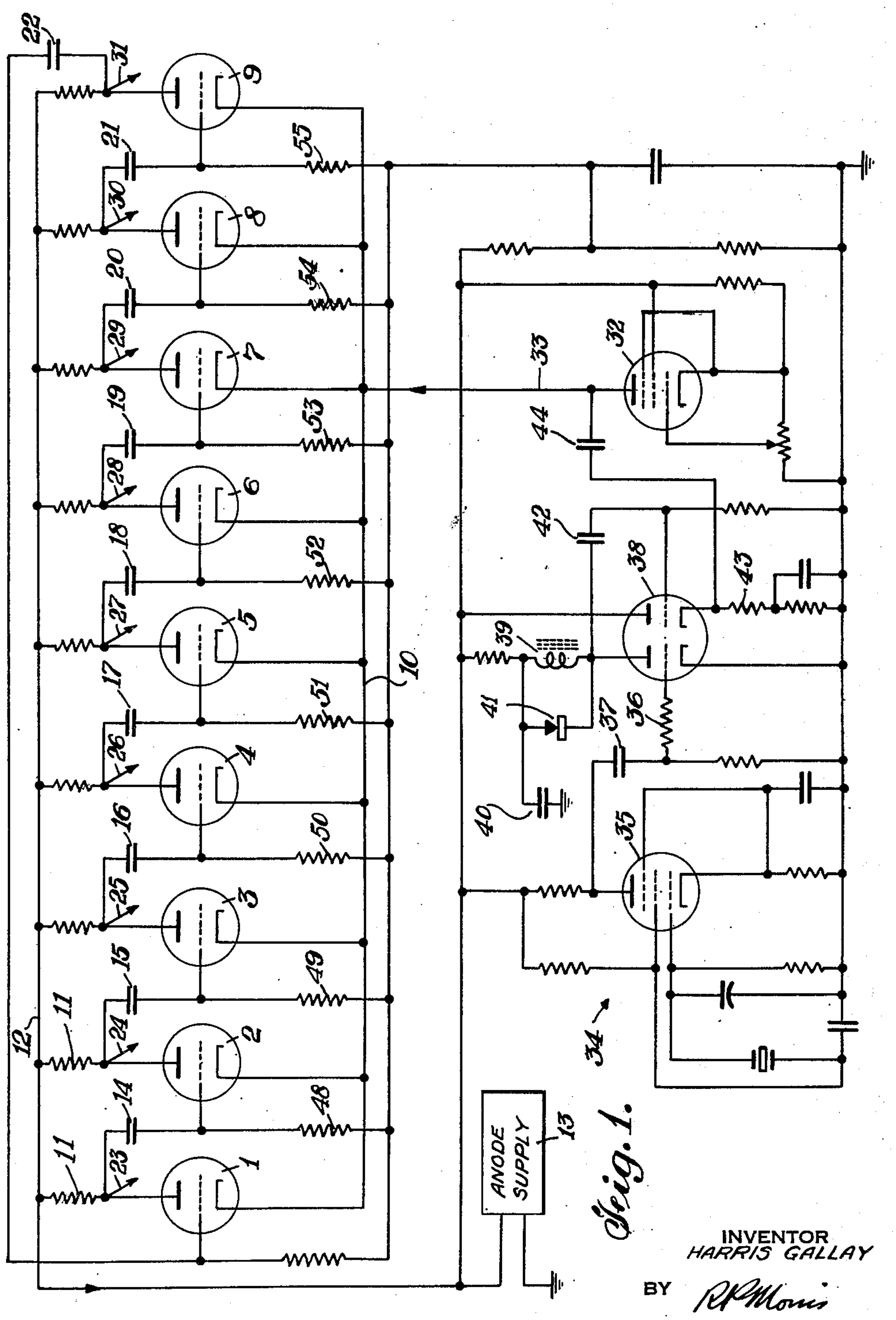
Fig. 1 is a schematic circuit diagram of a ring oscillator circuit in accordance with the invention.

Turning to Fig. 1, the ring oscillator is shown as comprising nine tubes, 1-9 inclusive, each provided with a cathode, control grid and anode. The cathodes are interconnected by a common cathode connection 10 and the anodes are interconnected over individual anode resistors 11 and a common anode lead 12 to a source of anode supply 13. The anodes of each of the tubes are inter-connected with the grid of the succeeding tube by means of coupling condensers 14-22 inclusive and each is provided with an output lead 23-31 inclusive. In series with common cathode connection is provided a current regulator constituted by pentode tube 32 connected on one side to ground and the other side to the common cathode connection through conductor 33. A crystal controlled oscillator is shown at 34 comprising a tube 35 and the necessary circuits therefor. The output of tube 35 is supplied over resistor 36 and coupling condenser 37 to the grid of one-half of a dual triode 38 which serves as an amplifier. In the first anode circuit of tube 38 is provided a coil 39 shunted by the condenser 40 which provides resonant circuit for shock excitation by the wave received from 38. This resonant circuit 39, 40, is shunted by a rectifier 41 so that only the first positive peak is effective. This peak wave is applied over a coupling condenser 42 to the input electrode of the other triode section of tube 38, the output of which is taken over a cathode resistor 43 and a coupling condenser 44 for application to the common cathode conductor 10 over line 33. Current regulator 32 is so biased that it will pass a substantially constant amount of current just sufficient to maintain one of the tubes of the ring oscillator conducting.

Figure 2:
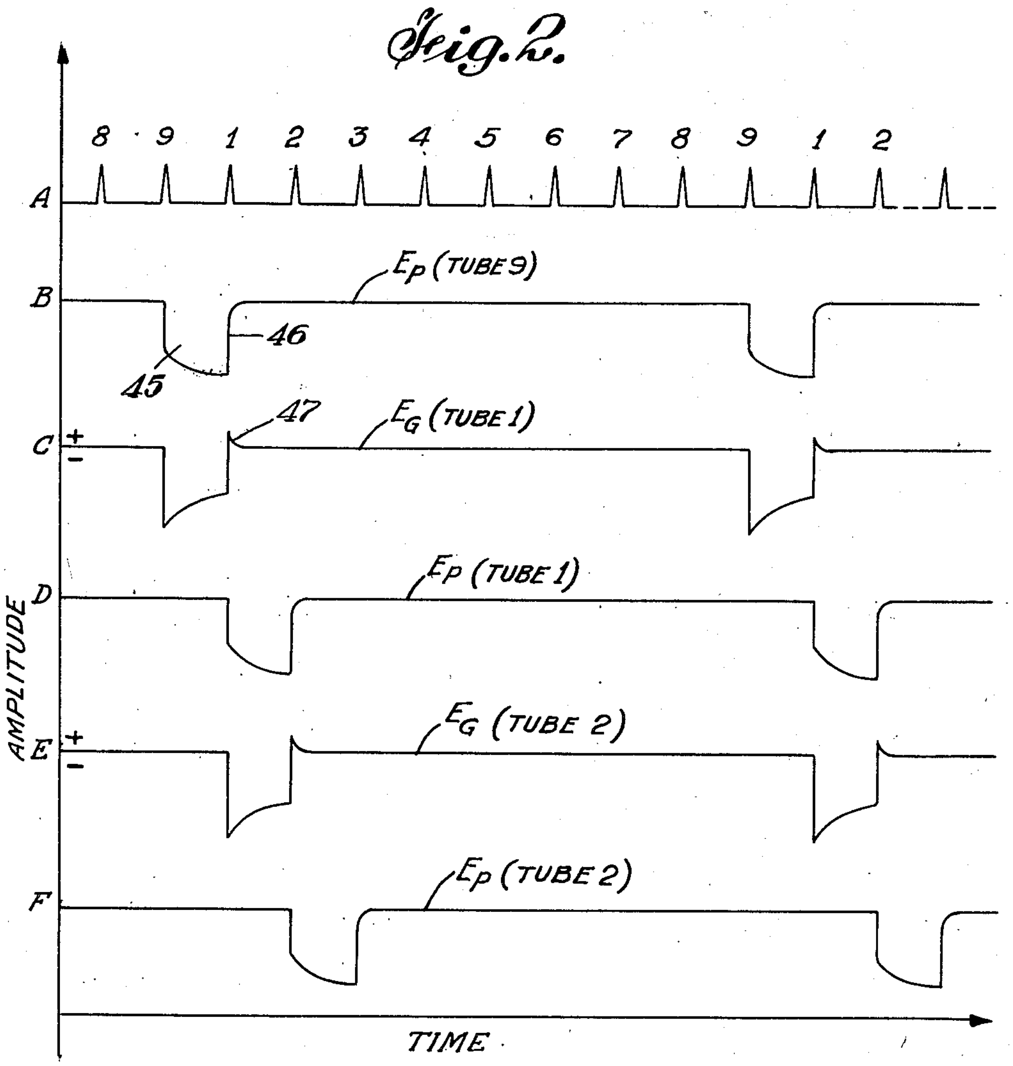
Fig. 2 is a series of graphs illustrating the operation of the circuit of Fig. 1.

Turning now to Fig. 2, the explanation of the operation of the circuit just described will be made for the circuit operating as a synchronised pulse generator. Curve A illustrates the pulse output from tube 38, the pulses being numbered 1–9 corresponding to applicable tube numbering of Fig. 1 Assume initially that tube 9 is conducting as indicated by pulse 45 on curve B of Fig. 2 having been started initially by the pulse 9 applied to cut-off tube 8 which initiates operation of tube 9. This tube 9 continues to conduct until pulse 1 is applied to the common cathode connection 10. The voltage on the grid of tube 1 is represented by curve c of the graph. While tube 9 is conducting the grid of tube 1 becomes more negative below the normal cut-off line value due to the coupling from the anode of tube 9. When positive pulse 1 is applied to the common cathode connection, only tube 9 can be cut-off since it is the only tube that is conducting. This tube is accordingly cut-off as shown by the vertical edge 46, of pulse 45. The anode of tube 9 therefore becomes more positive and the over-carry of positive change produces a positive peak 47 on the grid of tube 1 sufficient to overcome the blocking of this tube and the added positive cathode potential so that this tube 1 now starts to conduct, its plate output being in the form of curve D of Fig. 2. When pulse No. 2 is applied to the common cathode connection, tube 1 is likewise cut-off so that the next, tube 2 operates, its grid and anode potential following curves E and F. This cycle is repeated on around the chain of tubes and continues so long as pulses are supplied periodically to the cathode lead. It will thus be seen that in the output channels 23–31 there will appear various output pulses in succession which may be used for any desired purpose. These pulses have a fixed time duration equal to the time spacing between the pulses 1–9 of curve A. In this way it will be seen that a distribution of pulses of a constant width or time duration is produced the time duration being determined by the frequency of oscillator 34 from which the pulses are produced. It will be understood that with this type of operation the time constant of the circuits determined by the coupling condensers 14–21 and the accompanying grid resistors 48–55 is such that the time spacing between the pulses is less with this normal time constant.

If oscillator 35 and the pulse producing networks coupled therethrough condenser 44 are omitted the arrangement will operate as a free-running oscillator. Thus if we assume tube 9 is conducting, the plate of this tube will become negative with respect to the plate bias. As tube 9 continues to conduct the positive charge in condenser 21 decays, the cathode rapidly goes positive and the condenser 22 provides a differentiated negative pulse upon the grid of tube 1. The positive cathode potential for tube 9 continues to build up and the positive potential on the grid of tube 9 decays by virtue of its time constant until the effective grid-cathode potential causes cut-off. The tube then cuts off thereby providing a positive pulse to the grid of tube 1, causing it to conduct until the positive charge of condenser 22 decays through tube 1 similarly as in the case of condenser 21 for tube 9. The pulses are substantially rectangular to the action of the current regulator. The successive triggering continues on around the chain as explained previously. It will be readily seen that by adjusting the values of the time constant circuits of the tubes controllable output pulses may be produced successively in the outputs of the various tubes.

It will be seen that the circuit as described herein is extremely simple and yet is positive in operation. The system may be used as a frequency divider in which the frequency of an input oscillator is divided by the number N of tubes included in the chain. Alternately, the system may be operated as a timing oscillator in which pulses are sent out on the various lines corresponding with the normal time constant effects of the device operating as a free-running oscillator. Moreover, as described above the free-running oscillator may be arranged to be readily synchronised by application of a pulse from some external source.

While the principles of this invention have been described in connection with a specific embodiment it will be clearly understood that this is given merely by way of example. Many variations of the circuit will present themselves to those skilled in the art. The principal essential of the invention is the provision of a current regulator source in series with the ring type oscillator so that only one of the tubes therein may be operated at a time. The use of the common cathode connection for the purpose of triggering or synchronising the system is also an important subsidiary feature of this invention.

While I have described above the principles of my invention in connection with specific apparatus, it is to be clearly understood that this description is made only by way of example and not as a limitation of the scope of my invention.

What I claim is:

1. A circuit for producing in sequence over a series of output terminals pulses of substantially equal duration, comprising a series of electron discharge devices each having anode, cathode and grid electrodes, common anode and cathode supply circuits, resistance and capacitive elements for coupling the anode of each tube to the respective grids of the succeeding tube, an output terminal for each tube, and a constant current regulator adjusted to supply only sufficient current to said common supply circuits to maintain discharge of only one of said devices.

2. A circuit according to claim 1, further comprising means for supplying positive synchronizing pulses to said common cathode circuit.

3. A circuit according to claim 2, wherein said means for supplying positive synchronizing pulses comprises a source of positive pulses of a given periodicity.

4. A circuit according to claim 3, wherein said source of signals comprise a constant frequency oscillator and shaping means for shaping the output waves of said oscillator to produce accurately timed pulses.

5. A circuit according to claim 4, wherein said shaping means comprises, a limiter to produce substantially square waves, a shock excitable circuit shunted by a rectifier to produce pulses corresponding to the leading edge of each square wave oscillation, and a cathode follower coupler to apply said produced pulses to said common cathode circuit.

6. A circuit for producing in sequence over a series of $n$ output terminals an $n$ number of pulses, comprising a series of $n$ electron discharge devices each having an anode, a cathode and a grid electrode, a common anode supply lead coupled over individual anode load resistors to each of said anodes, a common cathode connection connected to all said cathodes, a coupling condenser connected to couple each anode to respective succeeding grid electrode, individual resistors connecting each grid to a common bias source, the time constants of each condenser resistor combination having a given value, $n$ output terminals and a constant current regulator tube coupled in series with said common cathode connection and the anode supply source of said tubes, said constant current regulator being adjusted to supply sufficient current to maintain only one of said electron discharge tubes in operation.

7. A circuit according to claim 6, further comprising a stable oscillator operating at a frequency such that each cycle is slightly shorter than the period determined by said time constant, means for shaping the output waves from said oscillator to provide positive pulses regularly spaced at one cycle intervals of said output waves, and means for supplying said positive pulses to said common cathode connection whereby said electron discharge devices will be sequentially operated for a period the duration of which is equal to the spacing of said positive pulses.

HARRIS GALLAY.

References Cited in the file of this patent

UNITED STATES PATENTS

| Number | Name | Date |
|---|---|---|
| 2,373,437 | Vanderlyn et al. | Apr. 10, 1945 |
| 2,404,918 | Overbeck | July 30, 1946 |
| 2,457,819 | Hoeppner | Jan. 4, 1949 |
| 2,512,984 | Trousdale | June 27, 1950 |